United States Patent [19]
Greiff

[11] Patent Number: 5,507,911
[45] Date of Patent: Apr. 16, 1996

[54] MONOLITHIC MICROMECHANICAL VIBRATING STRING ACCELEROMETER WITH TRIMMABLE RESONANT FREQUENCY

[75] Inventor: Paul Greiff, Wayland, Mass.

[73] Assignee: The Charles Stark Draper Laboratory, Inc., Cambridge, Mass.

[21] Appl. No.: 422,432

[22] Filed: Apr. 14, 1995

Related U.S. Application Data

[62] Division of Ser. No. 599,131, Oct. 17, 1990, Pat. No. 5,408,119.

[51] Int. Cl.$^6$ .................................................. H01L 21/00
[52] U.S. Cl. ............................ 156/651.1; 156/628.1; 156/657.1; 73/514.18; 73/514.23; 26/2
[58] Field of Search .................... 156/628.1, 647.1, 156/651.1, 657.1, 659.11, 662.1; 437/228, 238, 225; 216/2, 55, 62, 87; 73/517 R, 517 AV

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |

(List continued on next page.)

FOREIGN PATENT DOCUMENTS

| | | |
|---|---|---|
| 55-121728 | 9/1980 | Japan .................... 310/367 |
| 58-136125 | 8/1983 | Japan .................... 310/367 |
| 59-37722 | 3/1984 | Japan .................... 310/367 |
| 59-158566 | 9/1984 | Japan . |
| 61-144576 | 7/1986 | Japan . |
| 62-71256 | 4/1987 | Japan . |
| 62-221164 | 9/1987 | Japan . |
| 63-169078 | 7/1988 | Japan . |
| 2183040 | 5/1987 | United Kingdom . |

OTHER PUBLICATIONS

"A Vibratory Micromechanical Gyroscope", Boxenhorn et al, AIAA Guidance, Navigation and Control Conference, Aug. 15–17, 1988, pp. 1033–1040.

"Monolithic Silicon Accelerometer", Boxenhorn et al, Transduers '89, Proceedings of the 5th Int'l Conference, on Solid–State Sensors . . . , Jun. 25–30, 1989, pp. 273–277.

(List continued on next page.)

*Primary Examiner*—William Powell
*Attorney, Agent, or Firm*—Weingarten, Schurgin, Gagnebin & Hayes

[57] ABSTRACT

A monolithic, micromechanical vibrating string accelerometer with a trimmable resonant frequency is fabricated from a silicon substrate which has been selectively etched to provide a resonant structure suspended over an etched pit. The resonant structure comprises an acceleration sensitive mass and at least two flexible elements having resonant frequencies. Each of the flexible elements is disposed generally colinear with at least one acceleration sensitive axis of the accelerometer. One end of at least one of the flexible elements is attached to a tension relief beam for providing stress relief of tensile forces created during the fabrication process. Mass support, beams having a high aspect ratio support the mass over the etched pit while allowing the mass to move freely in the direction colinear with the flexible elements. Also disclosed is a method for fabricating such an accelerometer with high aspect ratio tension relief and mass support beams.

12 Claims, 3 Drawing Sheets

U.S. PATENT DOCUMENTS

| | | | |
|---|---|---|---|
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 5/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,674,331 | 6/1987 | Watson | 73/505 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 |
| 4,705,659 | 11/1987 | Bernstein et al. | 264/29.6 |
| 4,706,374 | 11/1987 | Murakami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 |
| 4,805,456 | 2/1989 | Howe et al. | 73/517 |
| 4,808,549 | 2/1989 | Mikkor et al. | 216/2 |
| 4,808,948 | 2/1989 | Patel et al. | 331/4 |
| 4,834,538 | 5/1989 | Heeks | 356/350 |
| 4,851,080 | 7/1989 | Howe et al. | 156/647 |
| 4,855,544 | 8/1989 | Glenn | 200/61.45 |
| 4,869,107 | 9/1989 | Murakami et al. | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 |
| 4,895,616 | 1/1990 | Higashi et al. | 156/647.1 |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 4,981,552 | 1/1991 | Mikkor et al. | 156/647.1 |
| 5,001,383 | 3/1991 | Kawashima | 310/367 |
| 5,016,072 | 5/1991 | Greiff | 357/26 |
| 5,038,613 | 8/1991 | Takenaka et al. | 73/510 |
| 5,045,152 | 9/1991 | Sickafus . | |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,205,171 | 4/1993 | O'Brien et al. | 73/517 B |
| 5,226,321 | 7/1993 | Varnham et al. | 73/505 |
| 5,233,874 | 8/1993 | Putty et al. | 73/517 V |
| 5,241,861 | 9/1993 | Hulsing, II | 73/505 |

OTHER PUBLICATIONS

"An Electrostatically Rebalanced Micromechanical Accelerometer", Boxenhorn et al, AIAA Guidance, Navigation and Control Conference, Aug. 14–16, 1989, pp. 118–122.

"The Micromechanical Inertial Guidance System and Its Application", boxenhorn et al., 14th Biennial Guidance Test Symposium, Oct. 3–5, 1989, pp. 113–131.

"Tensometric Accelerometers With Overload Protection", Moskalik, Meas. Tech., (USA), vol. 22, No. 12, (May 1980), pp. 1469–1471.

"Micromechanical Accelerometer Integrated with MOS Detection Circuitry", Petersen et al, IEEE Transactions on Electron Devices, vol. ED–29, No. (Jan. 1982), pp. 23–27.

"Quartz Rate Sensor Replaces Gyros", Defense Electronics, Nov. 1984, p. 177.

"A Monolithic Silicon Accelerometer with Integral Air Damping and Overrange Protection", Barth et al. IEEE 1988 pp. 35–38.

"Silicon As A Mechanical Material", Peterson et al., Proceedings of the IEEE, vol. 70, No. 5, May 1982, pp. 420–457.

"Machining In the Micro Domain", Rosen, Mechanical Engineering, Mar. 1989, pp. 40–46.

"Silicon micromechanics: sensors and actuators on a chip", Howe et al., IEEE Spectrum, Jul. 1990, pp. 29–35.

"Novel Electromechanical Micro–Machining and Its Application for Semiconductor Acceleration Sensor IC", M. Nakamura et al., *Digest of Technical Papers,* (1987), Institute of Electrical Engineers of Japan, pp. 112–115.

MONOLITHIC MICROMECHANICAL VIBRATING STRING ACCELEROMETER WITH TRIMMABLE RESONANT FREQUENCY

This application is a division of U.S. patent application Ser. No. 07/599,131, filed Oct. 17, 1990 (which will issue on Apr. 18, 1995 as U.S. Pat. No. 5,408,119).

FIELD OF THE INVENTION

This invention relates to accelerometers and more particularly, to a monolithic, micromachined, vibrating string accelerometer.

BACKGROUND OF THE INVENTION

Accelerometers serve as one of the major sensors used in inertial navigation systems as well as various other safety and control systems.

Accurate and reliable accelerometers require great precision and uniform operating results. Prior art accelerometers are generally assembled from a number of components which creates tremendous assembly problems associated with such precision devices. In addition, these accelerometers are typically large and may not be radiation hard.

Although other prior art accelerometers are fabricated utilizing a micromechanical process, no provisions are made for electrically isolating the proof mass from the flexures which is required to accurately and independently drive and sense the resonant frequency of each of the flexures. Additionally, none of these prior art devices have provided reliable means for easily and accurately adjusting the natural resonant frequency of the flexure.

SUMMARY OF THE INVENTION

This invention features a monolithic, micromechanical, vibrating string accelerometer with a trimmable resonant frequency fabricated from a silicon substrate which has been selectively etched to provide a resonant structure suspended over an etched pit. The resonant structure comprises an acceleration sensitive mass and at least two flexible elements each having a natural resonant frequency. Each of the flexible elements is disposed generally colinear with at least one acceleration sensitive axis of the accelerometer. A first end of each of the flexible elements is attached to opposite sides of the mass while at least one of the second ends are attached to at least one tension relief beam for providing stress relief of tensile forces between the suspended elements and the body of the structure.

In the preferred embodiment, there are first and second tension relief beams located adjacent removable regions of the resonant structure for facilitating removal of a portion of the removable regions and increasing the length and width of the opening forming the tension relief beam. Enlarging the opening forming the tension relief beams allows for trimming the resonant frequency of the flexible elements. The preferred embodiment further includes mass support beams having a high height-to-width ratio, for supporting the mass over the etched pit. The preferred embodiment further includes drive electronics for causing the flexible elements to resonate at a resonant frequency, and sense electronics to measure the frequency of the resonating flexible elements by sensing capacitance variations between a sense electrode and the resonating flexible element.

This invention also includes a method for fabricating a monolithic, micromechanical vibrating accelerometer with a trimmable resonant frequency including the steps of providing a single silicon substrate having an oxidized layer over the substrate and selectively removing regions of the oxidized layer. The silicon substrate is selectively doped through the regions of removed oxidized layer, to form etch resistant regions in the substrate. The substrate is then etched with an anisotropic etchant, forming a non-etched resonant structure which includes an acceleration sensitive mass, at least first and second flexible elements generally suspending the mass above an etched pit, at least a first tension relief beam attached to one of the first and second flexible elements, and first and second mass support beams.

DESCRIPTION OF THE DRAWINGS

These and other features and advantages of the present invention are described below in the following description and the accompanying drawings in which:

FIG. 1 is a top view of a schematic representation of the micromechanical vibrating string accelerometer including the tension relief and mass support beams according to the present invention;

DETAILED DESCRIPTION OF THE INVENTION

Figure 1:
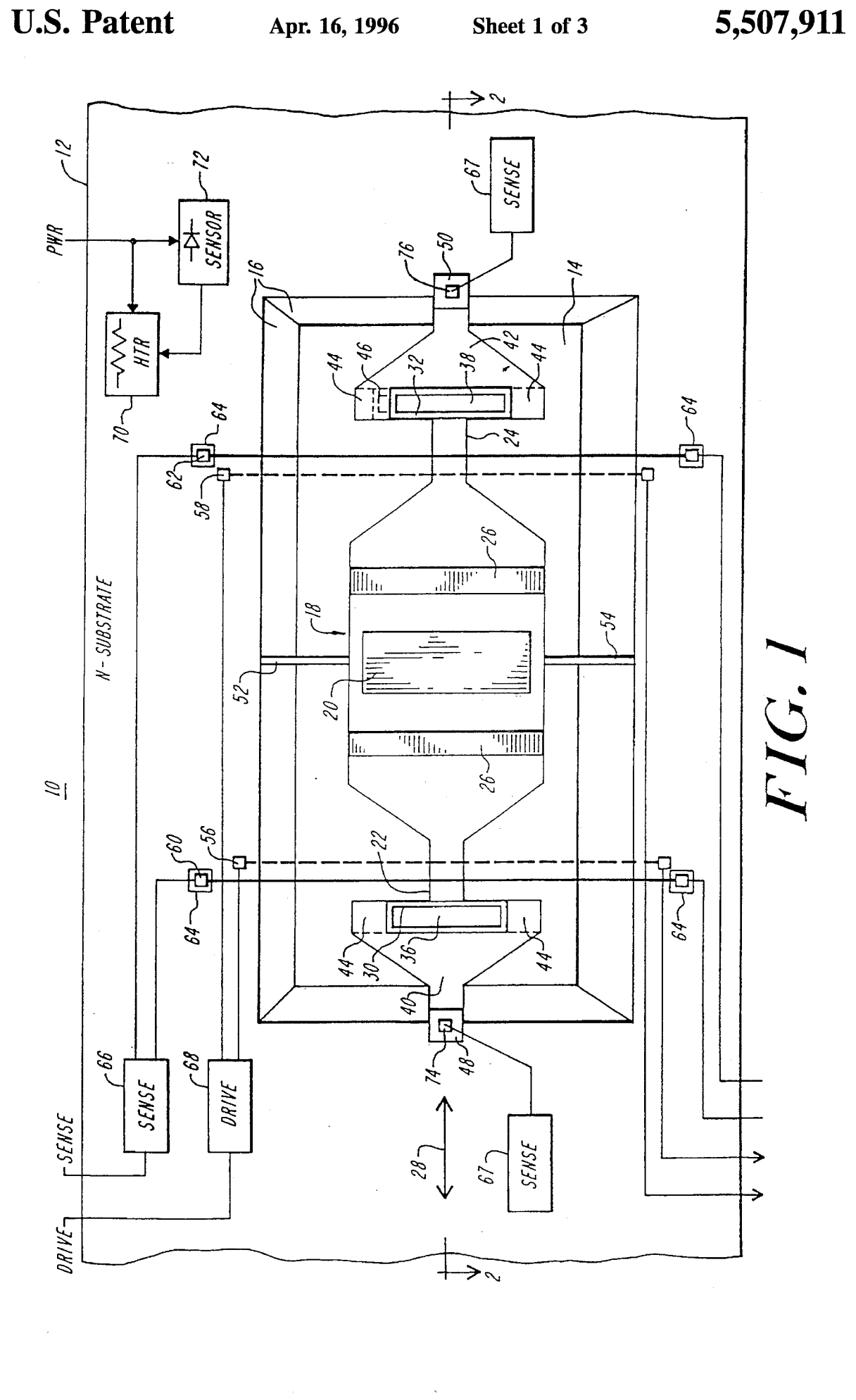
Figure 2:
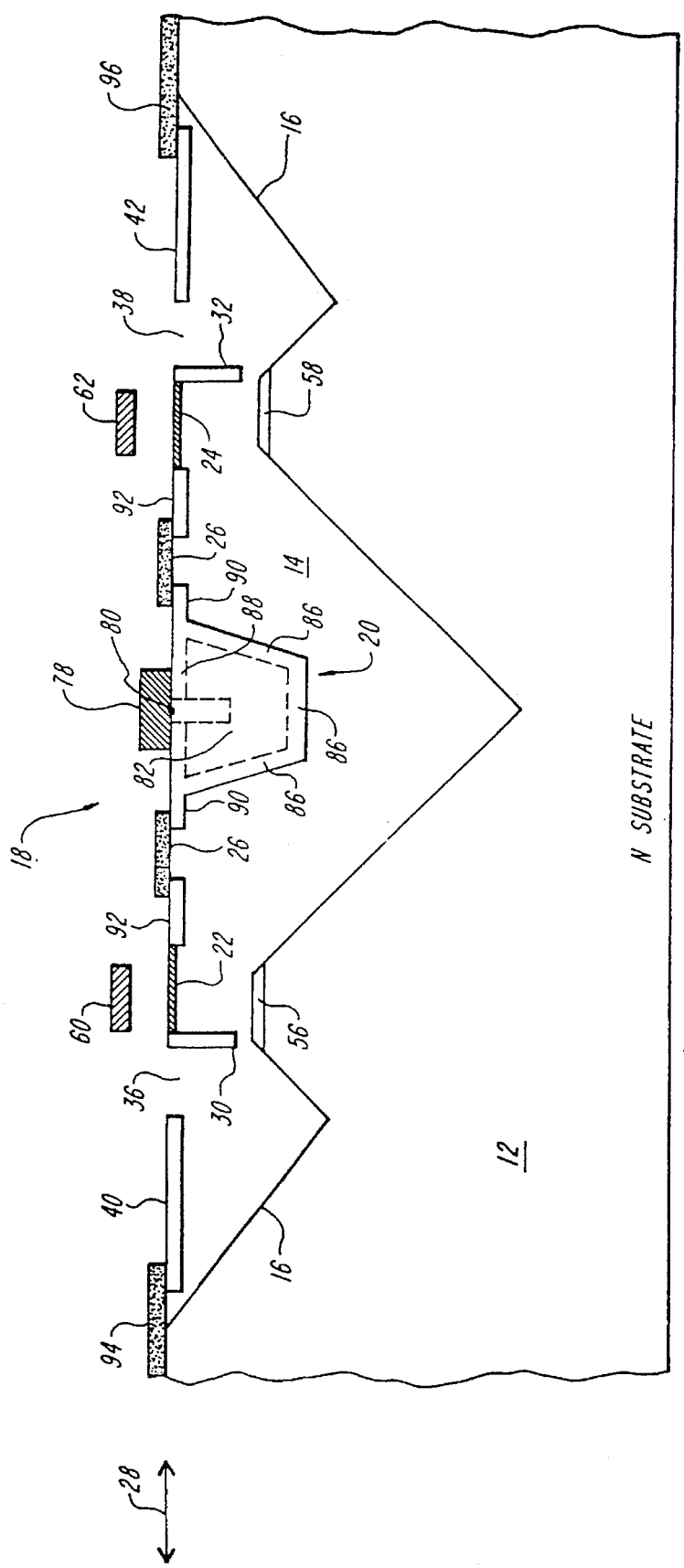
FIG. 2 is a cross-sectional view of the micromechanical vibrating string accelerometer of FIG. 1 taken along lines 2—2.

A monolithic, micromechanical vibrating string accelerometer with trimmable resonant frequency 10, FIG. 1 according to the present invention is fabricated from a single silicon substrate 12 employing the technique of selective oxide removal, diffusions into the substrate through the removed oxide regions, and anisotropic etching. Such methods will be further described herein and are also fully disclosed in Applicant's U.S. Pat. No. 5,195,371, filed on Feb. 14, 1990, entitled "Semiconductor Chip Transducer" which is a continuation-in-part application of U.S. patent application Ser. No. 143,515 filed on Jan. 13, 1988 (now abandoned) entitled "Method and Apparatus for Semi-Conductor Chip Transducer" which is incorporated herein by reference.

The etch stop diffusions and subsequent selective anisotropic etching create etched pit 14 having sloped sidewalls 16. Suspended over etched pit 14 is micromechanical vibrating string accelerometer 18 comprised of central proof mass 20 which is generally equally supported by flexible elements 22 and 24. Flexible elements 22 and 24 are isolated from proof mass 20 such as by dielectric lap joints 26.

One end of each of flexible elements 22 and 24 is attached to opposite sides of proof mass 20 and generally colinear with acceleration sensitive axis 28. In the preferred embodiment, the second end of each of the flexible elements is attached to tension relief beams 30 and 32. Although first and second tension recief beams are shown in the preferred embodiment, only one tension relief beam is required to trim the resonant frequencies of both the first and second flexible elements. The initial tension on flexible elements 22 and 24 is controlled by tension relief beams 30 and 32 which may be trimmed after the accelerometer has been fabricated to obtain a desired resonant frequency in flexible elements 22 and 24.

The Boron diffusion used to define the vibrating string accelerometer and the subsequent etching of the surrounding silicon causes shrinking that creates a high tensile force in the flexures. Tension relief beams 30 and 32 formed by openings 36 and 38 and supports 40 and 42 serve to relieve the stress by allowing the tension relief beams to deflect or bow slightly, thereby reducing the torsional stiffness of flexible elements 22 and 24 and serving to lower the resonant frequency of the flexible elements. Tension relief beams and a method for trimming the resonant frequency of a structure employing tension relief beams are described in greater detail in Applicant's U.S. Pat. No. 5,144,184, filed on Jan. 26, 1990 entitled "Micromechanical Device with a Trimmable Resonant Frequency Structure and Method of Trimming Same" incorporated herein by reference.

Support structures 40 and 42 further include removable regions 44 which have a thickness which is less than the thickness of the surrounding support structures 40 and 42. Providing areas of reduced thickness 44 facilitates enlargement of openings 36 and 38 as shown at 46, thereby further reducing the tension on tension relief beams 30 and 32 for trimming the resonant frequency of flexures 22 and 24 after the micromechanical vibrating string accelerometer has been fabricated. Trimming of the resonant frequency as shown at location 46 may be performed, for example, by utilizing a source of high intensity radiant energy such as a lasingtip to remove some of the area of reduced thickness 44. Support structures 40 and 42 are electrically isolated from silicon substrate 12 by means such as dielectric lap joints 48 and 50. Alternatively, support structures 40 and 42 may be isolated by means of a PN junction at regions 48 and 50.

Proof mass 20 is supported by proof mass support beams 52 and 54 which are mechanically connected to the proof mass and may be electrically isolated from the substrate. Like the tension relief beams, the mass support beams 52 and 54 are thin silicon ribbons having a high height-to-width ratio of typically 10-to-1. For example, mass support beams measuring 1 micron wide×10 microns high support the proof mass and prevent it from sagging while allowing the proof mass to move colinearly along the acceleration sensitive axis 28.

To operate the micromechanical vibrating string accelerometer of the present invention, flexible elements 22 and 24 are driven in a self-resonant mode by drive electronics such as buried drive electrodes 56 and 58, and sensed by sense electrodes such as bridge sense electrodes 60 and 62. Electrical contact regions 74 and 76 are provided to contact support structures 40 and 42 which are attached to flexible elements 22 and 24. These contacts regions contact the support structures through an opening in the dielectric lap joints as shown at 48 and 50. For greater accuracy and noise immunity, the footings of bridge electrodes 60 and 62 may be surrounded by P-type junction isolation regions 64 which may be used in a "driven shield" mode to effectively electrically isolate the bridge electrodes from the surrounding substrate, minimizing parasitic capacitance and resulting in lower noise and increased accuracy.

The monolithic micromechanical vibrating string accelerometer of the present invention uses on chip drive electronics 68 and sense electronics 66 and 67 to provide the drive and sense signals to the bridge, buried, and resonant structure electrodes. As a minimum, the drive and sense electronics include a number of buffers and amplifiers. Such electronics are described in greater detail in Applicant's co-pending U.S. patent application Ser. No. 07/528,051 entitled "Advanced Accelerometer" incorporated herein by reference. Additional on-chip circuitry includes heater electronics 70 which typically comprises a resistive element disposed in at least a portion of the substrate 14. Temperature sensing electronics 72 including a diode as well as other components, are coupled to heater electronics 70. The heater and temperature sensor insure that the accelerometer temperature is maintained at +/−0.01° C. to achieve measurement accuracy on the order of 1 ppm bias stability.

The monolithic micromechanical vibrating string accelerometer is shown in cross-section in FIG. 2 including etched pit 14 having sloped walls 16, over which is suspended vibrating string accelerometer 18. Proof mass 20 includes a mass of silicon approximately 400 microns long× 400 microns wide×50 microns deep, upon which is plated a gold counterweight 78 approximately 400 microns long× 400 microns wide×17.7 microns high. This provides the accelerometer with a center of gravity at point 80 and a sensitivity of approximately 4000 Hz/g.

Proof mass 20 is generally equally supported by flexible elements 22 and 24. The flexible elements are thin ribbons of silicon typically 0.5 microns thick×20 microns wide×200 microns long, with a resonant frequency of approximately 90 kHz.

Proof mass 20 is fabricated by anisotropically etching a region 82 through a surface oxide layer to form the center of what is to become the silicon "tub" portion of proof mass 20. The sidewalls and bottom of proof of mass 20 are then diffused with Boron as shown at 86 to form an etch stop for the subsequent etching process. The silicon "tub" is then backfilled by growing silicon over the Boron diffusion and capping the region silicon with a shallow Boron diffusion 88. The remainder of the proof mass and the adjacent structural regions 40, 42 and 90, 92 also receive a boron diffusion. Prior to undercutting by the etching process which will mechanically isolate the accelerometer, the proof of mass 20 is electrically isolated from the flexible elements 22 and 24 by depositing and patterning thick silicon nitride layers 26 which form a dielectric lap joint between the proof mass and the adjacent supporting structure 92. Similarly, dielectric electrically isolates lap joints 94 and 96 are formed and provided.

Flexible elements 22 and 24 are formed by a separate shallow boron diffusion, typically having a post etch thickness of 0.5 to 1.0 microns. Each of the flexible elements have a first end attached to opposite sides of proof mass 20, while a second end is attached to tension relief beams 30 and 32. In the absence of acceleration, flexible elements 22 and 24 will have a natural resonant frequency. Acceleration along acceleration sensitive axis 28 will result in a small movement of the proof mass which will increase the tension in one flexible element and reduce the tension in the other flexible 8 element. This change in tension in the flexible elements will result in a differential frequency shift between the flexible elements which is proportional to the acceleration causing the frequency shift.

Tension relief beams 30 and 32 are formed by openings 36 and 38 in support structures 40 and 42. Support structures 40 and 42 are also fabricated by a boron diffusion process prior to etching and undercutting. Nitride lap joint regions 94 and 96 electrically isolate the support structures and the flexible elements from silicon substrate 12. Alternatively, PN junctions may be used by extending regions 40,42 into substrate 12.

Figure 3:
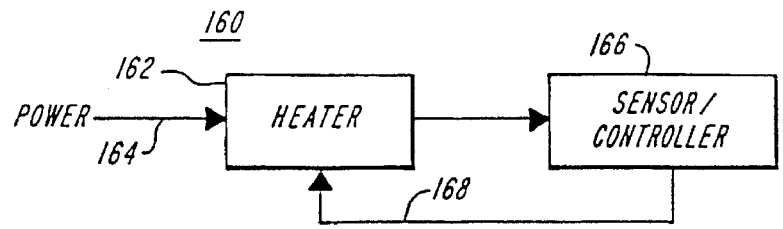
FIG. 3 is a block diagram illustrating the heater electronics employed in the present invention.

Flexible elements 22 and 24 are driven in a self-resonant mode and their resonant frequency sensed by means of at least one pair of buried electrodes 56 and 58 and bridge electrodes 60 and 62. Accelerometer and substrate heater and sensor/controller electronics are represented in block diagram 160, FIG. 3, wherein a heater 162 connected to a power source 164 is operative for maintaining a constant temperature of the substrate under control of sensor/controller 166 and sensor feedback signal path 168. On-chip circuitry which senses, heats and controls temperature are commercially available and well known to those skilled in the art.

Figure 4A:
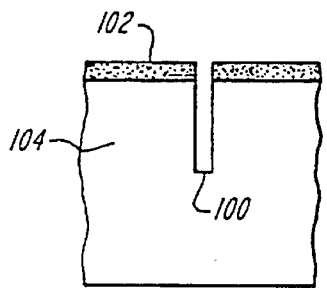
FIGS. 4A–4D illustrate the method of fabricating the tension relief and mass support beams of the present invention.
Figure 4B:
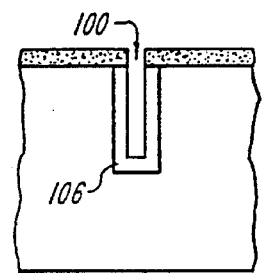

A feature of the monolithic, micromechanical vibrating string accelerometer of the instant invention is the ability to provide high aspect ratio tension relief beams and proof mass support beams. As illustrated in the embodiment shown in FIGS. 4A–4D, a method for fabricating such beams includes etching a slit or cut 100, FIG. 4A, through an oxidized layer 102 covering substrate 104. A Boron diffusion 106, FIG. 4B is then applied through etched slit 100. Etched slit 100 may be fabricated by means such as plasma etching or anisotropic etching.

Figure 4C:
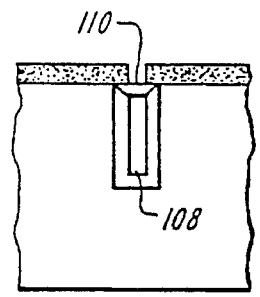
Figure 4D:
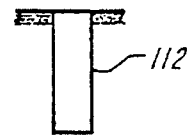

Slit 100 is then backfilled with silicon 108, FIG. 4C, by epitaxially growing silicon in the slit, and capping the silicon with a shallow diffusion 110. After anisotropic etching and undercutting of the structure, a high aspect ratio beam 112 remains. This method may be utilized to fabricate both tension relief and mass support beams. Alternatively, the slit may be left unfilled and a high aspect ratio "U" shaped box like structure will remain after etching to provide the support structure.

Figure 5C:
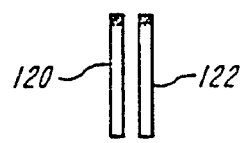
FIGS. 5A–5C illustrate an alternative method for fabricating tension relief and mass support beams of this invention.
Figure 5A:
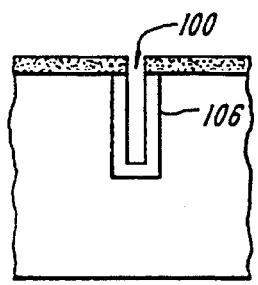
Figure 5B:
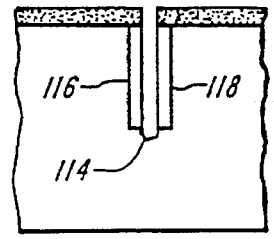

In an alternative embodiment, slit 100 is Boron diffused 106 as previously illustrated in FIG. 4B. In contrast to step 4C, however, the structure of FIG. 5B is again plasma etched to remove the bottom portion 114 of Boron diffusion 106, leaving side diffusions 116 and 118 intact. After anisotropic etching and undercutting, dual parallel support beams 120 and 122 remain. This technique may yield two parallel beams with aspect ratios of 10 or more and widths as low as 0.1 microns.

Although specific features of the invention are shown in some drawings and not in others, this is for convenience only as each feature may be combined with any or all of the other features in accordance with the invention.

Modifications and substitutions of the present invention by one of ordinary skill in the art are considered to be within the scope of the present invention, which is not to be limited except by the claims which follow.

I claim:

1. A method for fabricating a monolithic micromechanical vibrating accelerometer with a trimmable resonant frequency, comprising the steps of:

providing a single silicon substrate having an oxidized layer generally covering said substrate;

removing selected regions of said oxidized layer;

etching said silicon substrate with an anisotropic etchant, said etching forming a pit having sidewalls and a bottom;

selectively doping the sidewalls and bottom of said pit in said silicon substrate through the regions of selectively removed oxidized layer, to form etch resistant regions in said silicon substrate; and etching said silicon substrate with an anisotropic etchant, said etching forming at least one non-etched silicon resonant structure selected from the group consisting of:
an acceleration sensitive mass having a center of gravity;
at least first and second flexible elements generally equally suspending said mass above an etched pit and generally co-planar with a surface of said mass;
first and second tension relief beams attached to said first and second flexible elements; and
first and second mass support beams.

2. The method of claim 1 further including between the step of selectively doping and etching, the steps of:

growing silicon crystal material in regions which have had their oxidized layer removed and have been selectively doped; and capping said regions with an etch resistant layer to form an etch resistant mass.

3. The method of claim 2 wherein said etch resistant layer includes an oxidized layer.

4. The method of claim 2 wherein said etch resistant layer includes a doped layer.

5. The method of claim 1 further including after the step of etching said silicon substrate, the step of plating said acceleration sensitive mass to bring the center of gravity of said mass to the surface of said mass which is co-planar with said flexible elements.

6. A method of fabricating a micromechanical vibrating string accelerometer with a trimmable resonant frequency, comprising the steps of:

providing a single crystal silicon substrate;

selectively masking and doping surface portions of said substrate in the shape of electrodes;

growing an epitaxial spacer layer over said surface portions of said substrate;

selectively masking and doping surface portions of said epitaxial layer to form structure selected from the group consisting of:
an acceleration sensitive mass;
resonant flexures;
mass support beams; and
trimmable strain relief beams; and oxidizing said surface portions of said epitaxial layer to form an oxidized layer;

patterning an etch window in said oxidized layer by selectively etching portions of the oxide; and etching said silicon substrate inside the etch window with an anisotropic etchant to form said accelerometer suspended over a pit in said substrate and said electrodes.

7. The method of claim 6 further comprising the steps of:

anisotropically etching said pit in the silicon substrate;

doping bottom and sidewall portions of said pit to render said doped bottom and sidewall portions etch resistant;

filling said pit with silicon by selective epitaxial deposition; and doping a top portion of said pit to form an etch resistant mass, wherein said etch resistant mass is used for increasing the inertial mass of said accelerometer.

8. The method of claim 6 further comprising the steps of:

reactive ion etching a slit in said epitaxial layer;

doping the inner surface portions of said slit to render said inner surface portions etch resistant;

selectively filling said slit with silicon; and doping a top portion of said filled slit to create a beam having a high aspect ratio, wherein said beam provides strain relief mass support beams.

9. The method of claim 7 wherein said selective masking and doping of surface portions of said epitaxial layer form resonant flexures and wherein said method further comprises the step of electroplating a mass opposite said etch resistant mass, said electroplated mass moving the center of gravity or the center of inertia of said accelerometer to the center of a plane containing said resonant flexures.

10. The method of claim 6 same as wherein said selective masking and doping of surface portions of said epitaxial layer forms resonant flexures and wherein said method further the step of forming at least one electroplated bridge structure over said resonant flexures to provide additional electrodes for exciting or sensing motion of said flexures.

11. The method of claim 6 further comprising the steps of depositing a layer of silicon nitride over said surface portions of said substrate and said doped surface portions of said epitaxial layer and patterning said silicon nitride layer; and anisotropically etching said silicon nitride layer to form a dielectric lap joint mechanically connecting but electrically isolating regions of said accelerometer.

12. A micromechanical device with a trimmable resonant frequency for detecting acceleration along an acceleration sensitive axis comprising:

a silicon resonant structure suspended over a silicon substrate and comprising an acceleration sensitive mass and at least two flexible elements having a resonant frequency, said at least two flexible elements substantially equally suspending said acceleration sensitive mass, wherein each of said flexible elements is disposed substantially colinear with respect to said acceleration sensitive axis and has first and second ends, with a first one of said flexible elements having its first end attached to a first side of said mass and a second one of said flexible elements having its first end attached to a second side of said mass opposite said first side; and an opening formed in the second end of at least one of said flexible elements and having a length and width, said opening including an edge located a distance from said at least one flexible element, wherein said distance defines a first tension relief beam flexible in a direction parallel to said acceleration sensitive axis, for deflecting a first distance under longitudinal tension and for providing stress relief of longitudinal tensile forces between said flexible elements and said tension relief beam, thereby establishing a trimmable resonant frequency for said flexible elements.

* * * * *